US006349888B1

United States Patent
Au et al.

(10) Patent No.: US 6,349,888 B1
(45) Date of Patent: Feb. 26, 2002

(54) SURROUND SYSTEM PEST CONTROL (76) Inventors: Wing Leung Au, 10 Ribbon Gum Close; Bruce Harold Taylor, 13 Ribbon Gum Close, both of Alfords Point 2234, New South Wales (AU)

( * ) Notice: Subject to any disclaimer, the term of this patent is extended or adjusted under 35 U.S.C. 154(b) by 0 days.

(21) Appl. No.: 09/616,089

(22) Filed: Jul. 14, 2000

Related U.S. Application Data (63) Continuation of application No. PCT/AU99/01011, filed on Nov. 24, 1999.

(51) Int. Cl.[7] .......................... B05B 15/10; B05B 3/00; B05B 3/02
(52) U.S. Cl. .................. 239/208; 239/207; 239/222.11
(58) Field of Search ............................... 239/207, 208, 239/209, 201, 214.15, 193, 222.11, 222.19, 267, 467; 43/124, 132.1; 169/13, 16, 37

(56) References Cited

U.S. PATENT DOCUMENTS

| | | | | |
|---|---|---|---|---|
| 3,151,746 A | * | 10/1964 | Reustle et al. ................ 43/124 |
| 3,676,949 A | * | 7/1972 | Ramsey ........................ 43/124 |
| 4,171,092 A | * | 10/1979 | Ragsdale ..................... 239/208 |
| 4,219,161 A | * | 8/1980 | Freissle ....................... 239/523 |
| 4,893,434 A | * | 1/1990 | Knipp et al. .................. 43/124 |
| 5,347,749 A | * | 9/1994 | Chitwood et al. ............ 43/124 |
| 5,359,806 A | * | 11/1994 | Jeffery et al. ................. 43/124 |
| 5,678,637 A | * | 10/1997 | O'Connell .................... 169/46 |

* cited by examiner

Primary Examiner—Kevin Shaver
Assistant Examiner—David Hwu
(74) Attorney, Agent, or Firm—David A. Frey (57) ABSTRACT

An insecticide dispensing apparatus for delivering insecticide from an outside source to a building having a foundation and a roof space thereunder. The apparatus includes an access unit having an inlet port external to the building, an upper pipeline arrangement having at least one outlet is located in the roof space and extends to the access unit. A lower pipeline arrangement including at least one outlet is located under the foundation. This lower pipeline arrangement also extends to the access unit whereby insecticide is effectively distributed with respect to the building.

20 Claims, 12 Drawing Sheets

SURROUND SYSTEM PEST CONTROL

RELATED APPLICATIONS

This application is a continuation from PCT international application No. PCT/AU99/01011, having an international filing date of Nov. 24, 1999.

FIELD OF THE INVENTION

This invention relates generally to an insect control system and, more particularly, to an insect controls system built into a building.

BACKGROUND OF THE INVENTION

Insects in general, and more particularly, termites are destructive to structures, especially those made of wood. The termite is quiet and through in its job of causing major structural damage. This in turn could make an individual a financial hostage in their own home. Therefore, if they could eradicate the threat of termites with an effective pest control system, a homeowner can feel more secure in the investment they have made in their home.

Most termites enter the structure of a house through cracks in the concrete slab and drainage pipelines. From there, they travel up into the walls, roof, flooring and any other wooden structure. Because of this, an insect control system that was located within the structure of a building would be an important improvement in the art.

OBJECTS OF THE INVENTION

An object of the invention is to provide an apparatus for delivering insecticide to a building that overcomes some of the problems and shortcomings of the prior art.

Another object of the invention is to provide an apparatus for delivering insecticide to a building that eliminates the need for human exposure to the chemicals being used.

Another object of the invention is to provide an apparatus for delivering insecticide to a building that results in no direct contact between the apparatus and the soil.

Yet another object of the invention is to provide an apparatus for delivering insecticide at low pressure to a building.

Still another object of the invention is to provide an apparatus for delivering insecticide to a building that effectively delivers insecticide into the space beneath the roof.

Yet another object of the invention is to provide an apparatus for delivering insecticide under the foundation of a building. How these and other objects are accomplished will become apparent from the following descriptions and from the drawings.

SUMMARY OF THE INVENTION

The invention involves an insecticide dispensing apparatus for delivering insecticide from an outside source to a building having a foundation and a roof space thereunder. In the preferred embodiment, the apparatus is comprised of an access unit having an inlet port external to the building, an upper pipeline arrangement having at least one outlet is located in the roof space and extends to the access unit. A lower pipeline arrangement including at least one outlet is located under the foundation. This lower pipeline arrangement also extends to the access unit whereby insecticide is effectively distributed with respect to the building.

In practicing the invention, the building foundation can include a concrete slab, a basement floor, or any other base support the structure.

In one embodiment of the invention, the outlet in the upper pipeline arrangement is a spray head. In a version of this embodiment, a plurality of spray heads are joined together with the upper pipeline arrangement and fixed to support beams located within the roof space in order to evenly disperse powdered insecticide over a controlled distance. In this embodiment, the pipeline arrangement extends from the roof space through a cavity inside the house to the access unit, thereby allowing insecticide spray to be injected from outside the house through a powder injector connector to the system. In a more specific version of this embodiment, the spray heads are three-way spray heads. In yet another specific version, the three-way spray heads include a deflection plate and a flow control.

In another embodiment of the invention, at least three connection points are located at the access unit. The connection points include a plurality of dry powder spray connectors and at least one liquid insecticide injector connector. An overflow indicator is also included within the system.

In a preferred embodiment of the invention, the lower pipeline arrangement is built into a blue metal pebble soaker bed. In this embodiment, the pipeline arrangement is joined together with anchor spray heads. In such an embodiment, the blue metal pebble soaker bed is positioned under a concrete slab and around the perimeter of a house, and the soaker bed and spray heads are wrapped in a protective netting and soil proof casing, thereby preventing foreign material from contaminating the soaker bed and spray heads. In another version of this embodiment, the lower pipeline arrangement includes a plurality of holes and insecticide is dispersed from the holes in the pipeline as well as from the spray heads when a pressurized liquid insecticide is injected into the system. In this version, the liquid insecticide is injected from outside of the house.

In another version of the preferred embodiment, insecticides are injected via the liquid connector into the soaker bed to the overflow indicator located at the end of the pipeline system. In another version of the embodiment, only one liquid injector connector is located in the external-access unit.

In another embodiment of the invention, the insecticide dispensing apparatus is comprised of an access unit having an inlet port external to the building and a pipeline arrangement in the roof space and extending to the access unit. The pipeline arrangement includes at least one outlet in the roof space, whereby insecticide is effectively distributed within the roof space of the building. In a particular version of this embodiment, the outlet in the pipeline arrangement is a spray head.

In another version of this embodiment, a plurality of spray heads are joined together with the pipeline arrangement and fixed to support beams located within the roof space in order to evenly disperse powdered insecticide over a controlled distance and the pipeline arrangement extends from the roof space through a cavity inside the house to the access unit, thereby allowing insecticide spray to be injected from outside the house through a powder injector connector to the system. In a more specific version of this embodiment, the spray heads include three-way spray heads. These three-way spray heads may include a deflection plate and a flow control.

In still another version of this embodiment, at least three connection points are located at the access unit including a plurality of dry powder spray connectors, at least one liquid insecticide injector connector, and an overflow indicator.

In still another embodiment of the invention, the insecticide dispensing apparatus is comprised of an access unit having an inlet port external to the building and a pipeline arrangement under the foundation and extending to the access unit. The pipeline arrangement includes at least one outlet under the foundation, whereby insecticide is effectively distributed with respect to the building. In this embodiment, the foundation can include a concrete slab, a basement floor, or an base which supports the structure.

In a particular version of this embodiment, the lower pipeline arrangement is built into a blue metal pebble soaker bed. In this embodiment, the lower pipeline arrangement is joined together with anchor spray heads, the blue metal pebble soaker bed is positioned under a concrete slab and around the perimeter of a house, and the soaker bed and spray heads are wrapped in a protective netting and soil proof casing, thereby preventing any foreign material from contaminating the soaker bed and spray heads. In a more particular version of this embodiment, the lower pipeline arrangement includes a plurality of holes and insecticide is dispersed from the holes in the lower pipeline arrangement as well as from the spray heads when a low-pressurized liquid insecticide is injected into the system.

In another version of the embodiment, the liquid insecticide is injected from outside of the house. In a more specific version, insecticides are injected via a liquid connector into the soaker bed to an overflow indicator located at the end of the lower pipeline arrangement.

DETAILED DESCRIPTION OF THE PREFERRED EMBODIMENTS

Figure 1:
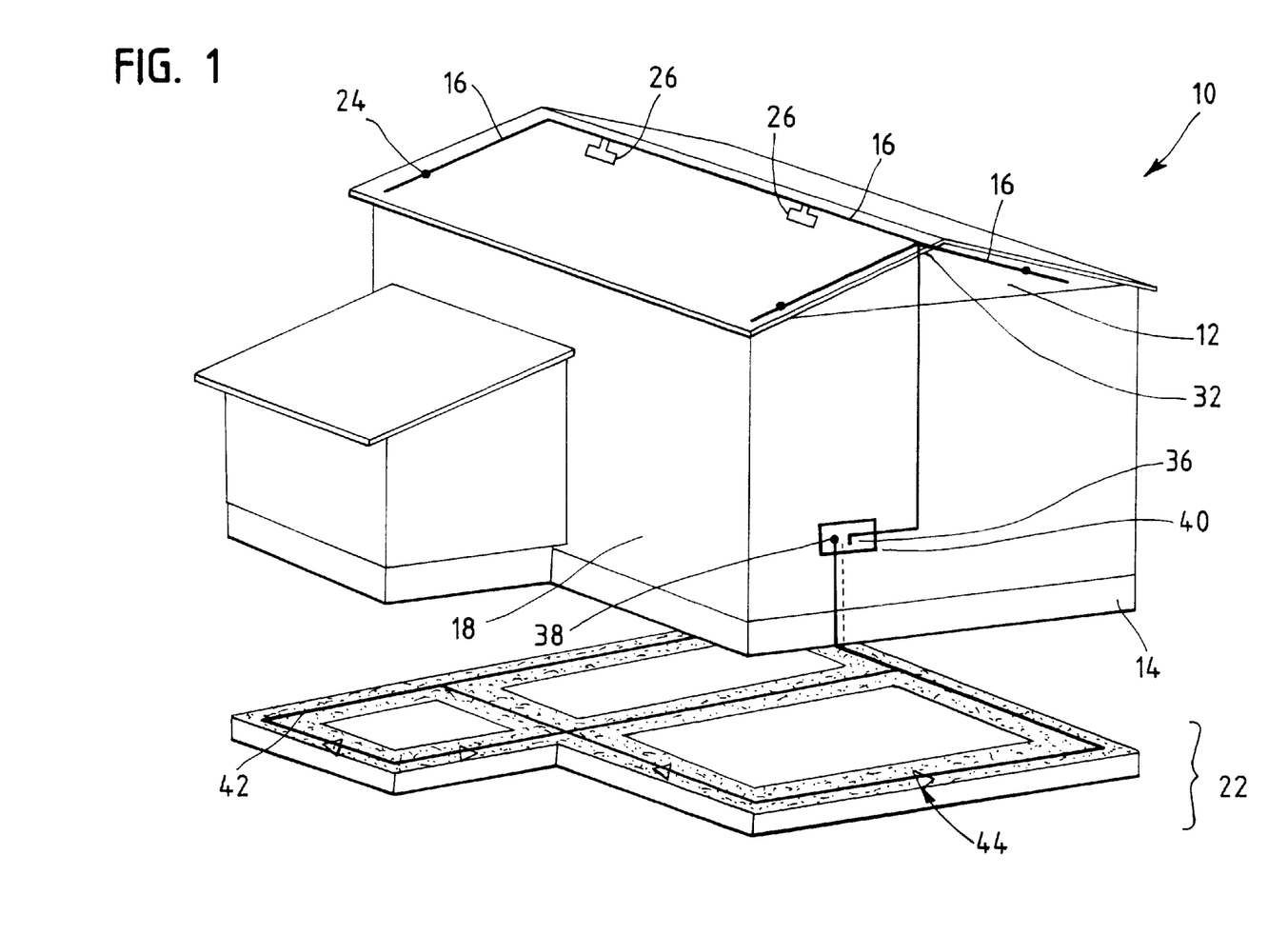
FIG. 1 is perspective view of a housing structure showing the insect dispensing apparatus located within the roof space and the foundation.

The invention involves an insecticide dispensing apparatus 10 for delivering insecticide into a roof space 12 and under a housing foundation 14. As shown in FIG. 1, the insecticide dispensing system 10 is comprised of a plurality of pipelines 16 located within the roof space 12 and under the construction slab 14 of a building 18. The apparatus 10 is specially designed for all types of construction and is effective on most household insects e.g., termites, ants, spiders, and silverfish.

The apparatus includes two major components: (1) a dry powder pressure spray system 20 and (2) a termite proof soaker bed system 22.

Figure 2:
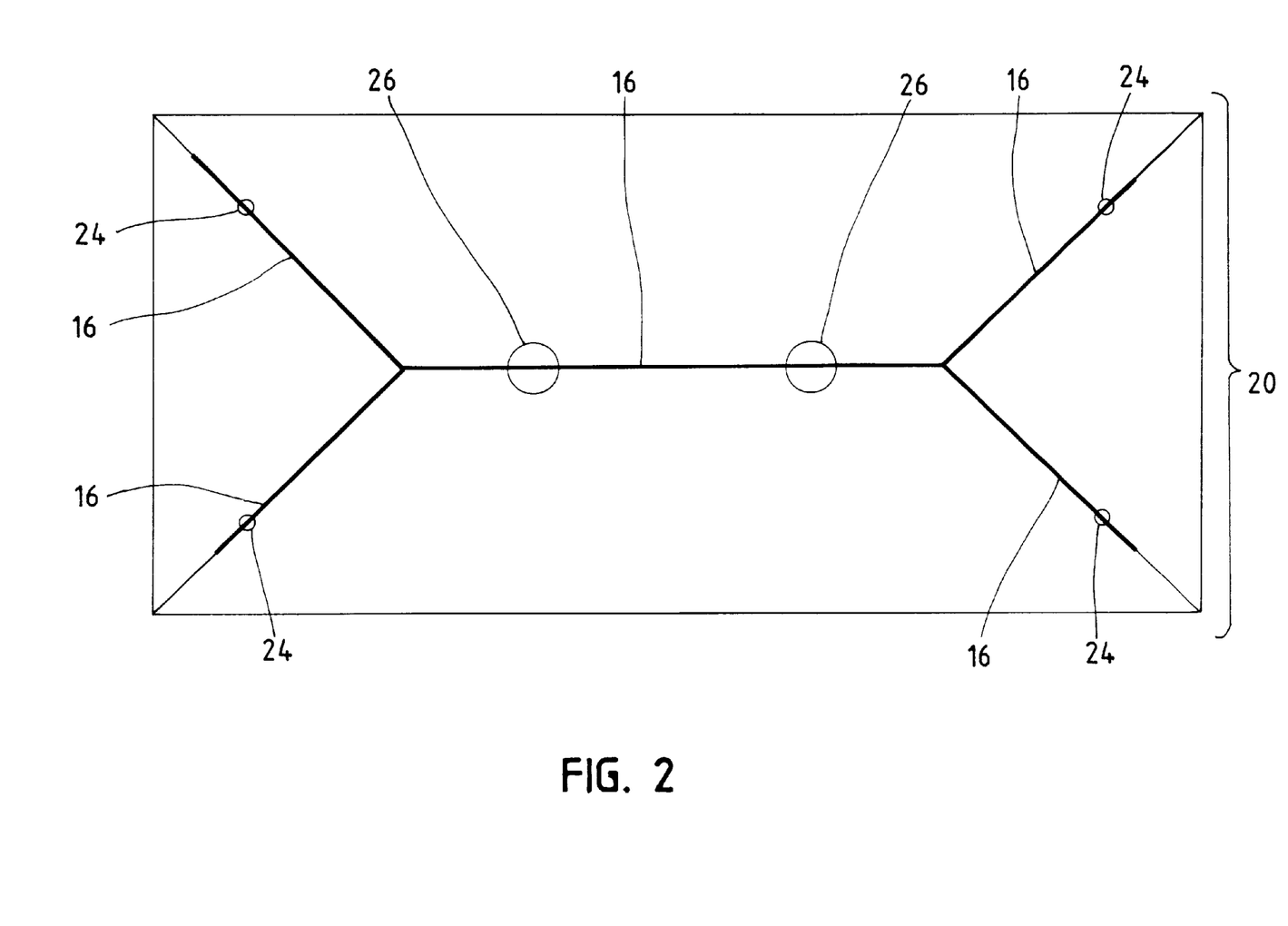
FIG. 2 is a top view of the housing structure showing the pipeline arrangement installed in the roof space.
Figure 4:
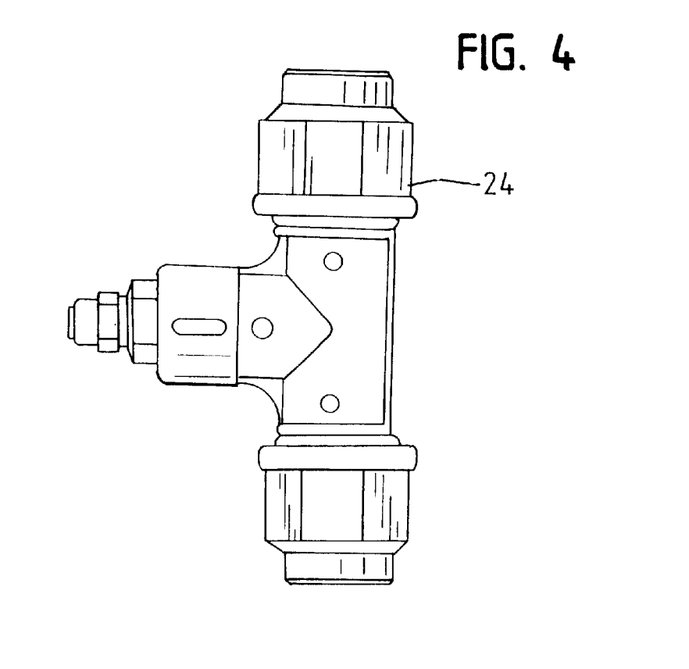
FIG. 4 is a side view of a single-spray head.
Figure 5:
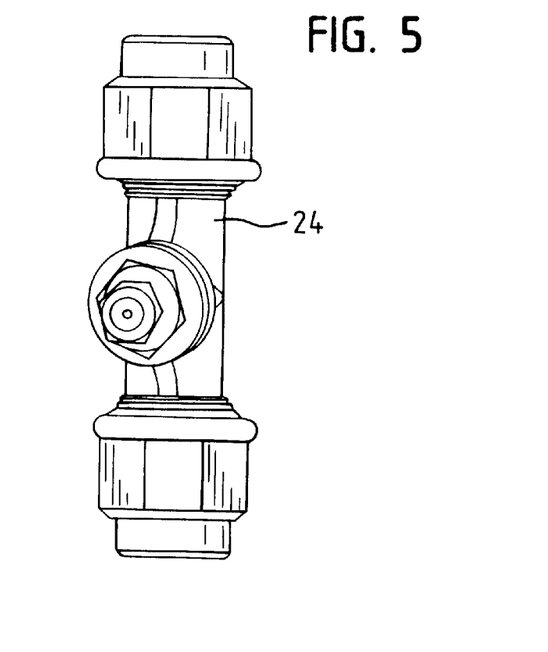
FIG. 5 is a top view of a single-spray head.
Figure 6:
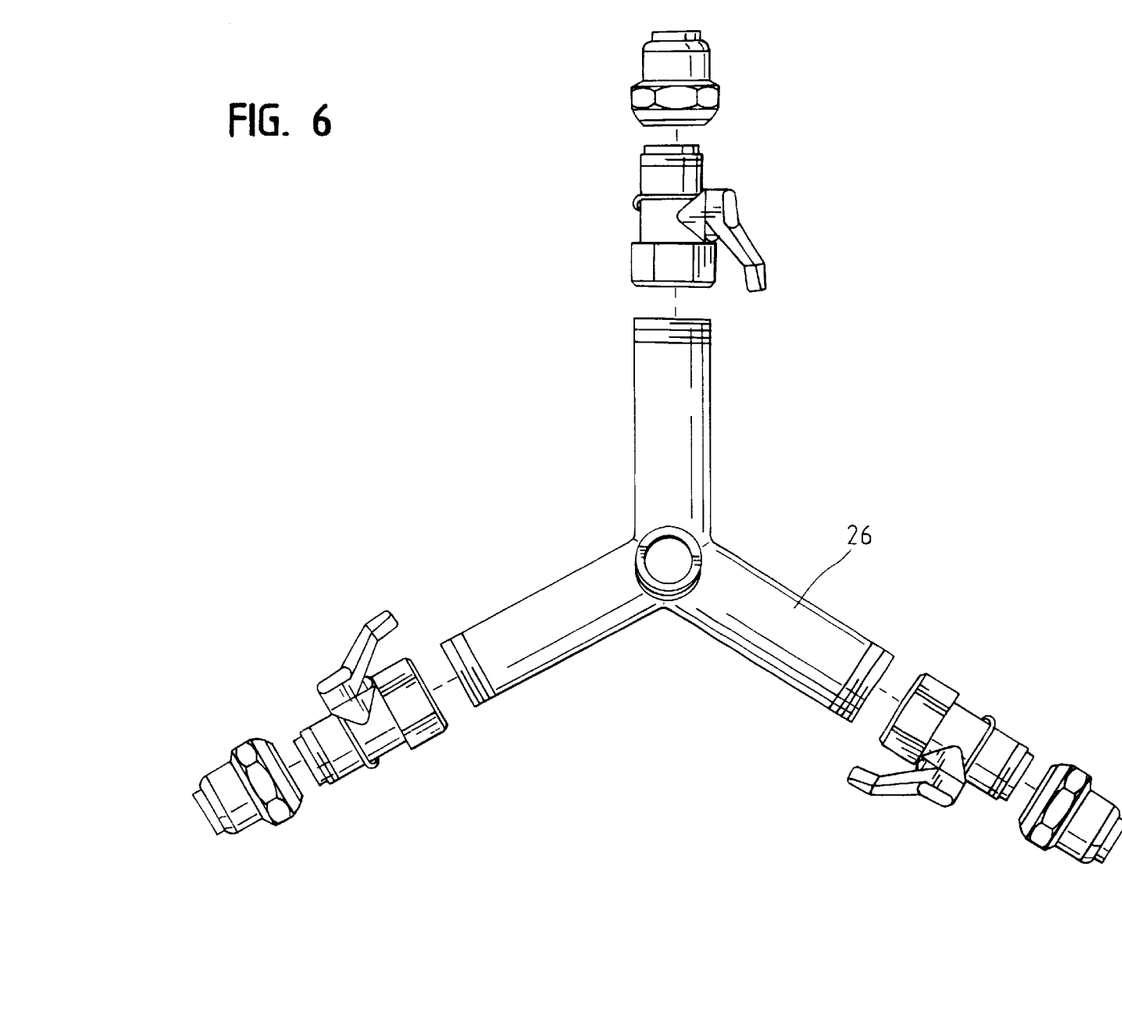
FIG. 6 is a top view of a three-way spray head.

As shown in FIGS. 1 and 2, the dry powder pressure spray system 20 is installed inside the ceiling space 12 through a few specially designed single-spray heads 24, such as those shown in FIGS. 4 and 5. The system can also be utilized with single-spray heads 24 in combination with three-way spray heads 26 with deflection plates 28 and flow control 30, such as those shown in FIGS. 6–8. In such heads 26, the flow control 30 is used to control the distance of the flow.

The spray heads 24, 26 are joined together with pipelines 16 and fixed to rafters 32 or the top cord of trusses in order to evenly disperse powered insecticide so as to achieve a complete fumigation effect inside the roof space 12.

Figure 3:
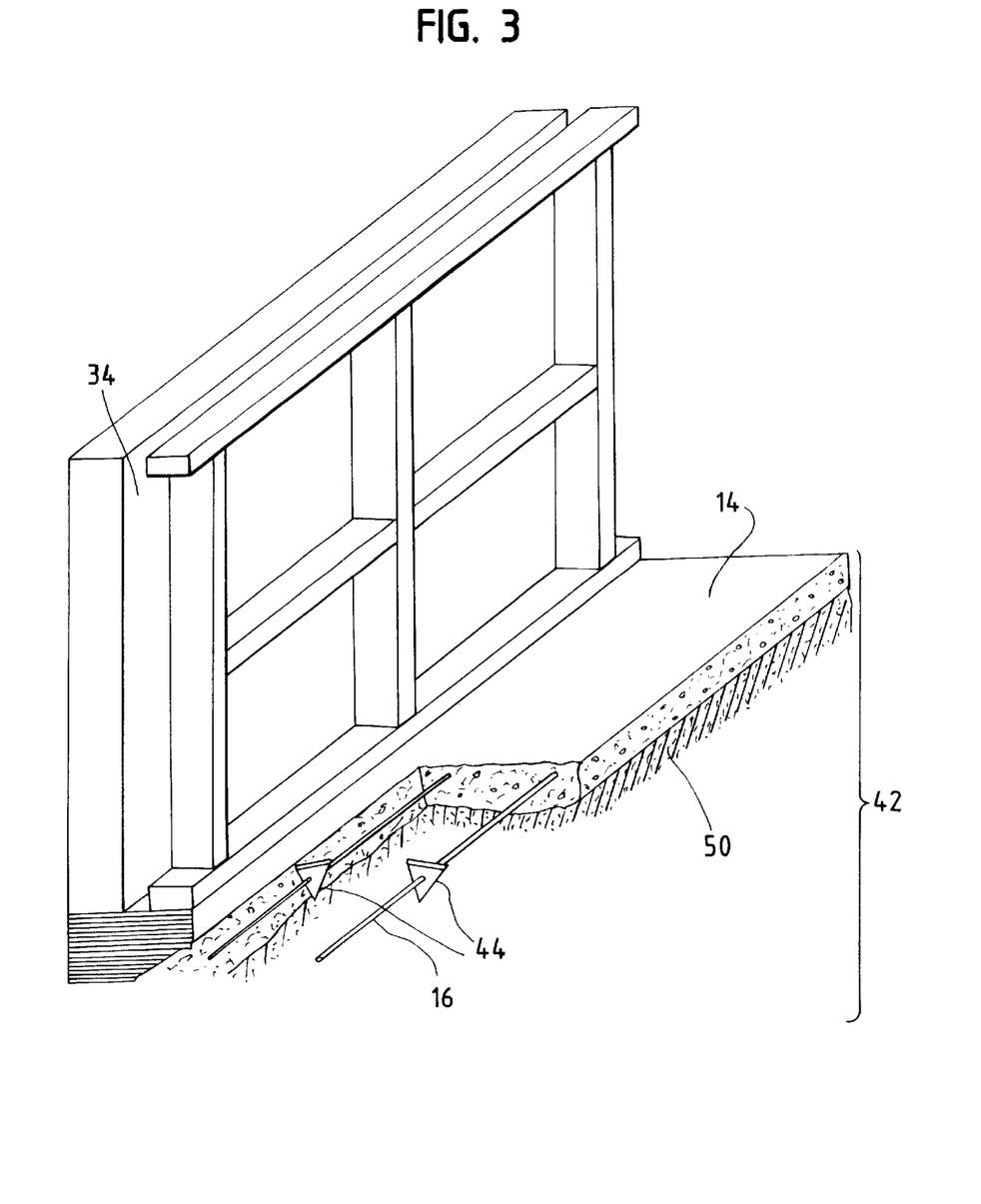
FIG. 3 is a cut-away perspective view showing the sidewall of a housing structure and the pipeline arrangement installed under the foundation.

In this system, as shown in FIGS. 1 and 3, the pipelines 16 from the roof space 12 extend down through the brick cavity 34 inside the house 18 (near ground level) and connect to the powder spray connector 36 which is located inside the unit 40. Such an arrangement results in a very powerful way to disperse insecticide without any human exposure to the chemicals being used.

In one embodiment of the invention, a plurality of spray heads 24,26 are joined together with the pipelines 16 and fixed to support beams 32 located within the roof space 12 in order to evenly disperse powdered insecticide over a controlled distance. In this embodiment, the pipelines 16 extend from the roof space 12 through a cavity 34 inside the house 18 to an opening 38 in the foundation 14, thereby allowing insecticide spray to be injected from outside the house 18 through a powder injector connector to the system. In one version of this embodiment, the spray heads 24 are three-way spray heads 26.

Figure 7:
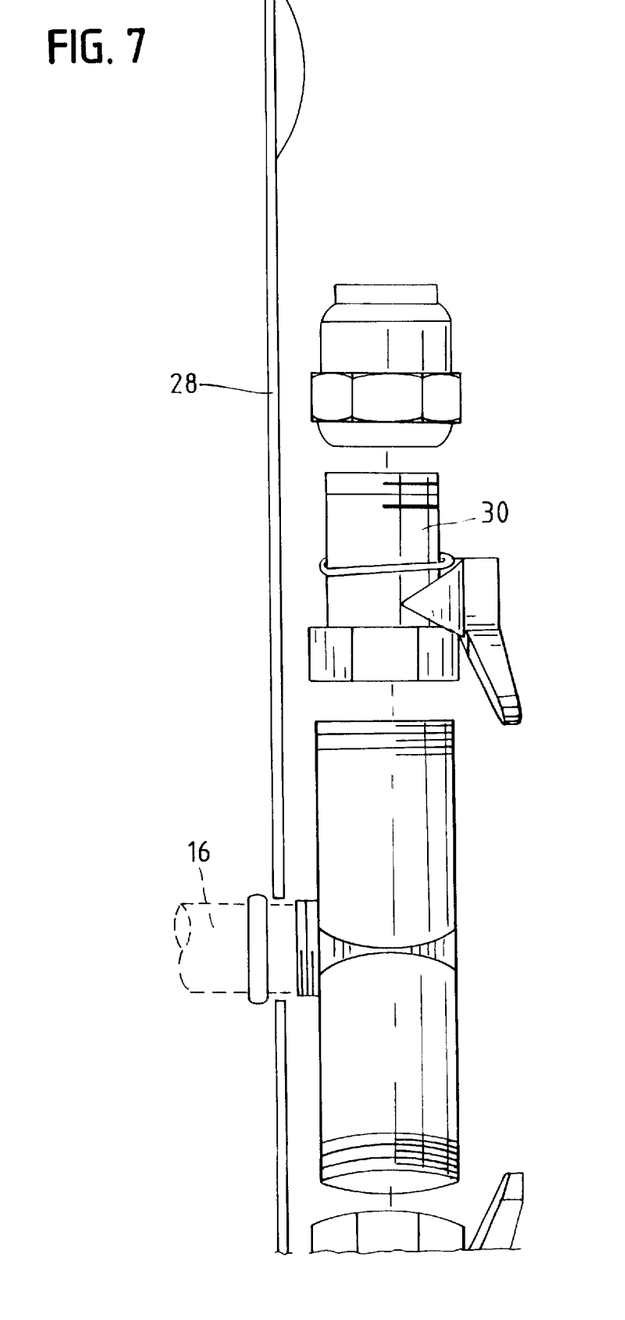
FIG. 7 is a side view of a three-way spray head.
Figure 8:
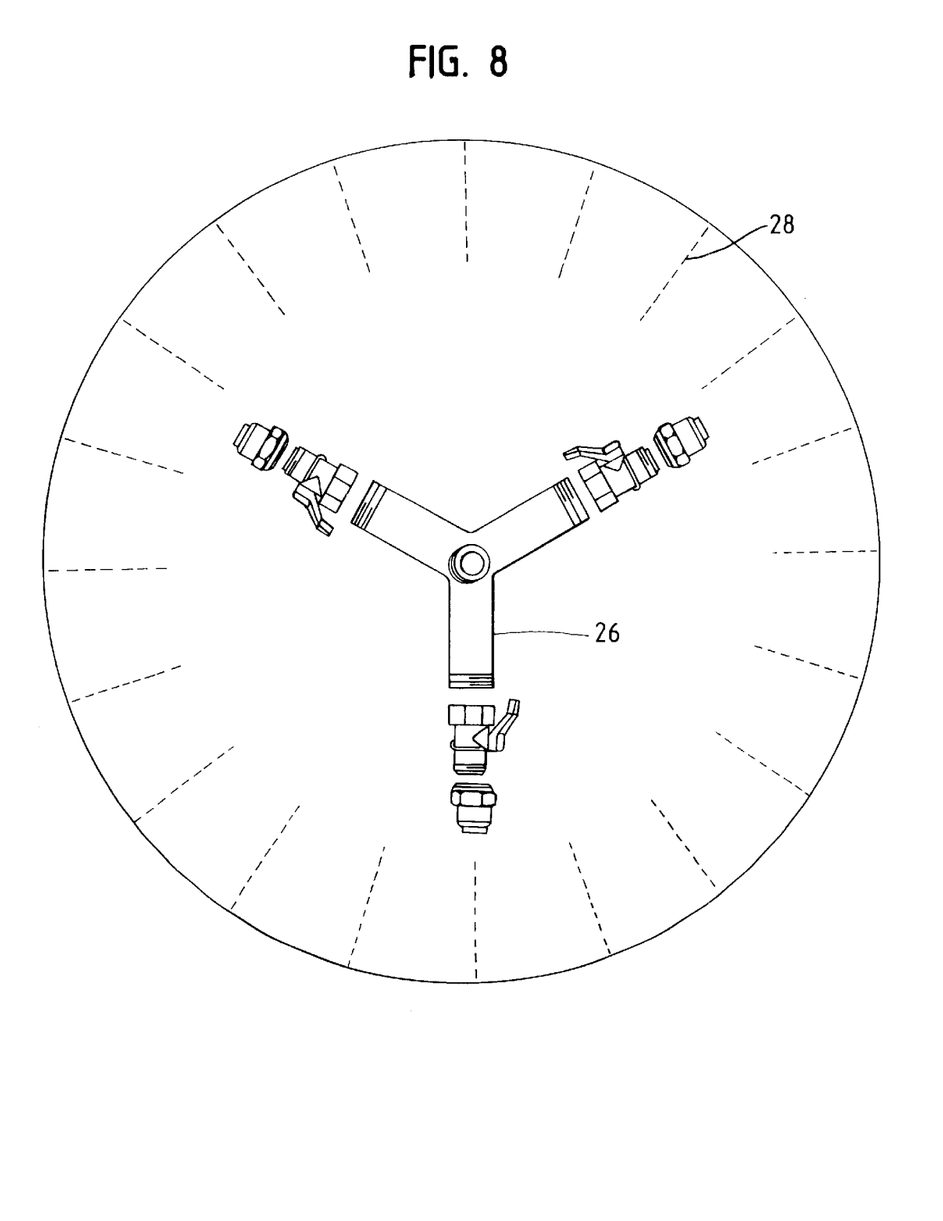
FIG. 8 is a top view of a three-way spray head positioned on a deflector plate.

The three-way spray heads 26 are specially designed spray heads having a flow control 30. As shown in FIGS. 7 and 8, finned deflection plates 28 are built on top of the spray head unit 26 to allow for deflection and dispersal of powder insecticide down toward the desired spot. Furthermore, the flow control 30 on the individual spray head 26 will control the desired distance the insecticide in sprayed.

In a more specific version of this embodiment, at least three connection points (not shown) are located at an unit 40. A plurality of dry powder spray connectors along with at least one liquid insecticide injector connector and an overflow indicator are also included within the system.

In another embodiment of the invention, as shown in FIG. 13, the insecticide dispensing apparatus 10 is in the form of a soaker bed 42 of insecticides that can only be installed before a house is built. The soaker bed 42 works by laying injection piping 16, as shown in FIGS. 3 and 13, at approximately 50 mm under the concrete slab 14 around the perimeter area of a house 18. All of this piping 16 is joined together with specially designed anchor-spray heads 44 such as those shown in FIGS. 10–12.

The anchor-spray head 44 is a unit that is preferably made of stainless steel. These spray heads 44 are capable of covering a very large underground area including up to the extent of the concrete slab 14 if required.

The function of the anchor-spray head 44 is to anchor the pipeline 16 firmly onto the blue metal pebbles plus offer spray function. There are also drip holes 46 at the bottom of the spray head 44 for clearing insecticide residue. A baffle having a narrow passage is built inside the unit thereby reducing and minimizing the pressure of the piping system. The anchor-spray head 44 can also collect the residue of the insecticide when clean air is pushed into the system after the insecticide is sprayed. This procedure will ensure the residue of insecticide drains into the anchor-spray head 44 and then completely away into the blue metal pebble soaker bed 42.

In the soaker bed embodiment, piping 16 will preferably be buried into blue metal pebbles which will be wrapped by a layer of nylon netting and finally by layers of breathable nylon membrane 50 in order to stop any foreign material from mixing with the blue metal pebbles or going into the soaker bed system 42. This burying and wrapping of the piping 16 results in a soil-proof casing that prevents the piping 16 from having any direct contact with the ground.

Figure 9:
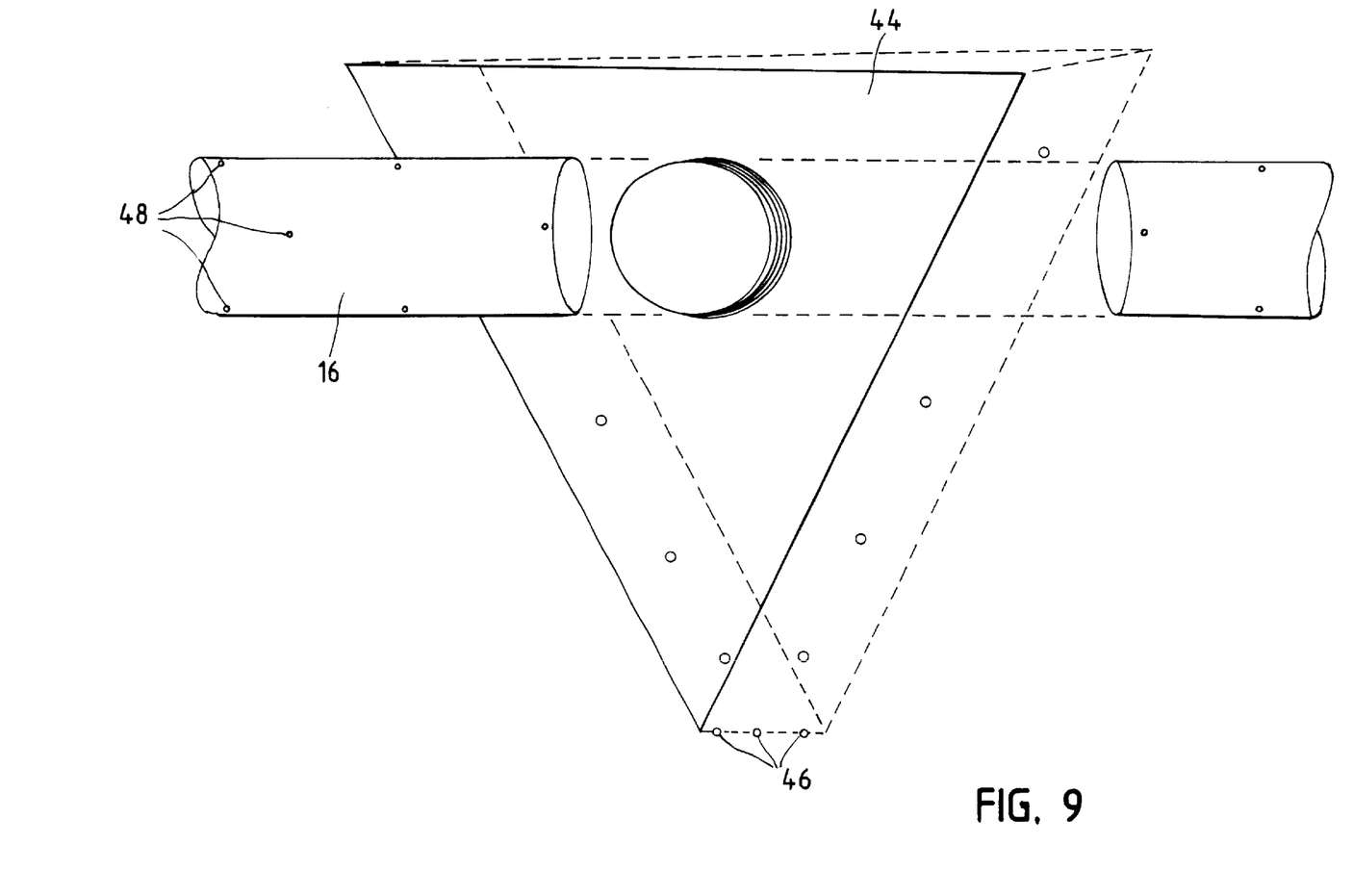
FIG. 9 is a perspective of a pipeline section and an anchor-spray head.
Figure 10:
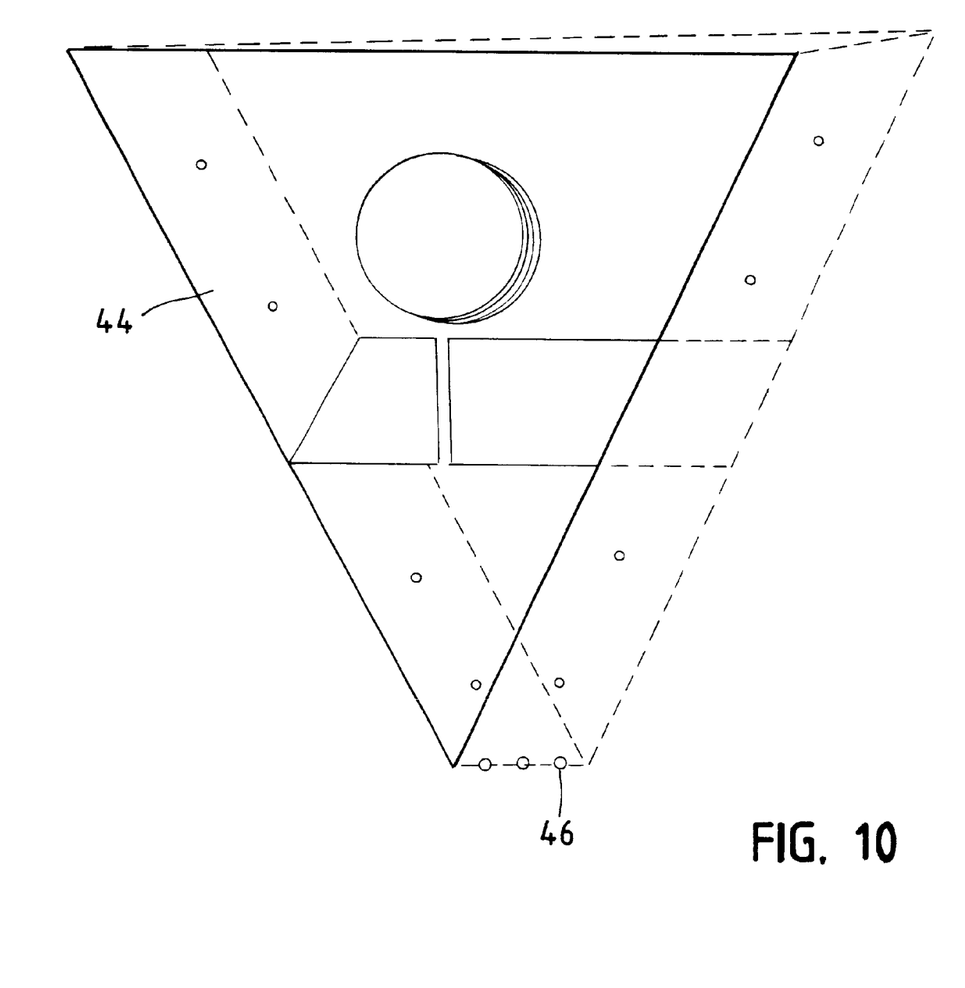
FIG. 10 is an isometric view of an anchor-spray head.
Figure 11:
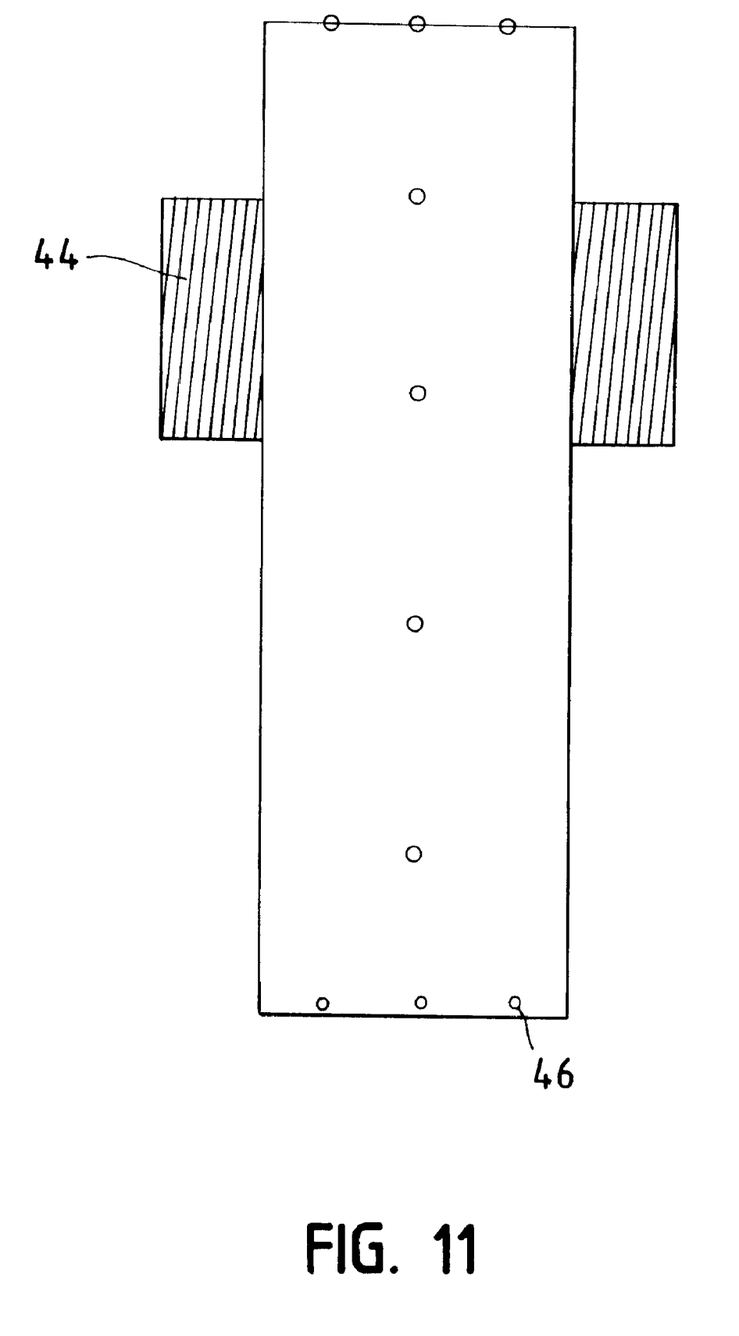
FIG. 11 is a side view of an anchor-spray head.
Figure 12:
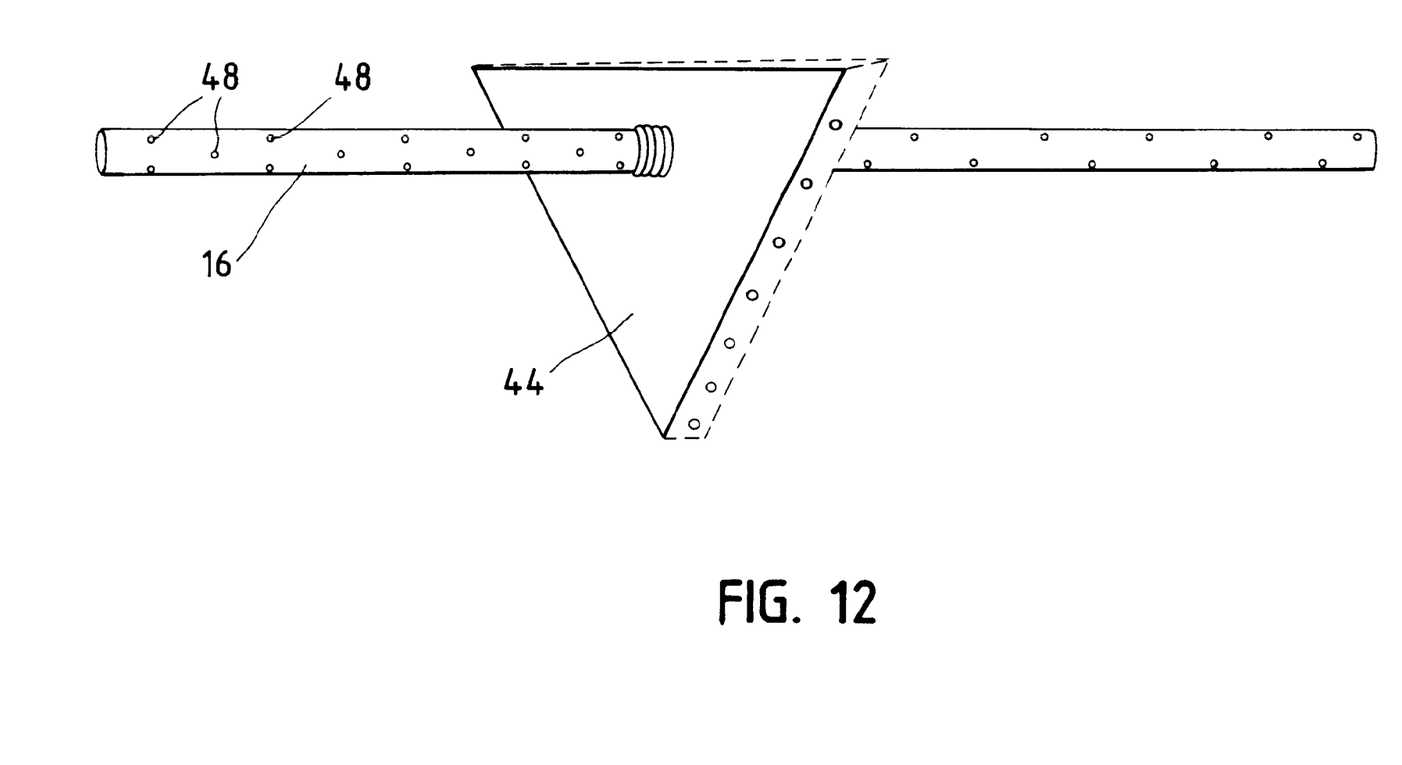
FIG. 12 is a view of an anchor-spray head with a pipeline connect thereto.
Figure 13:
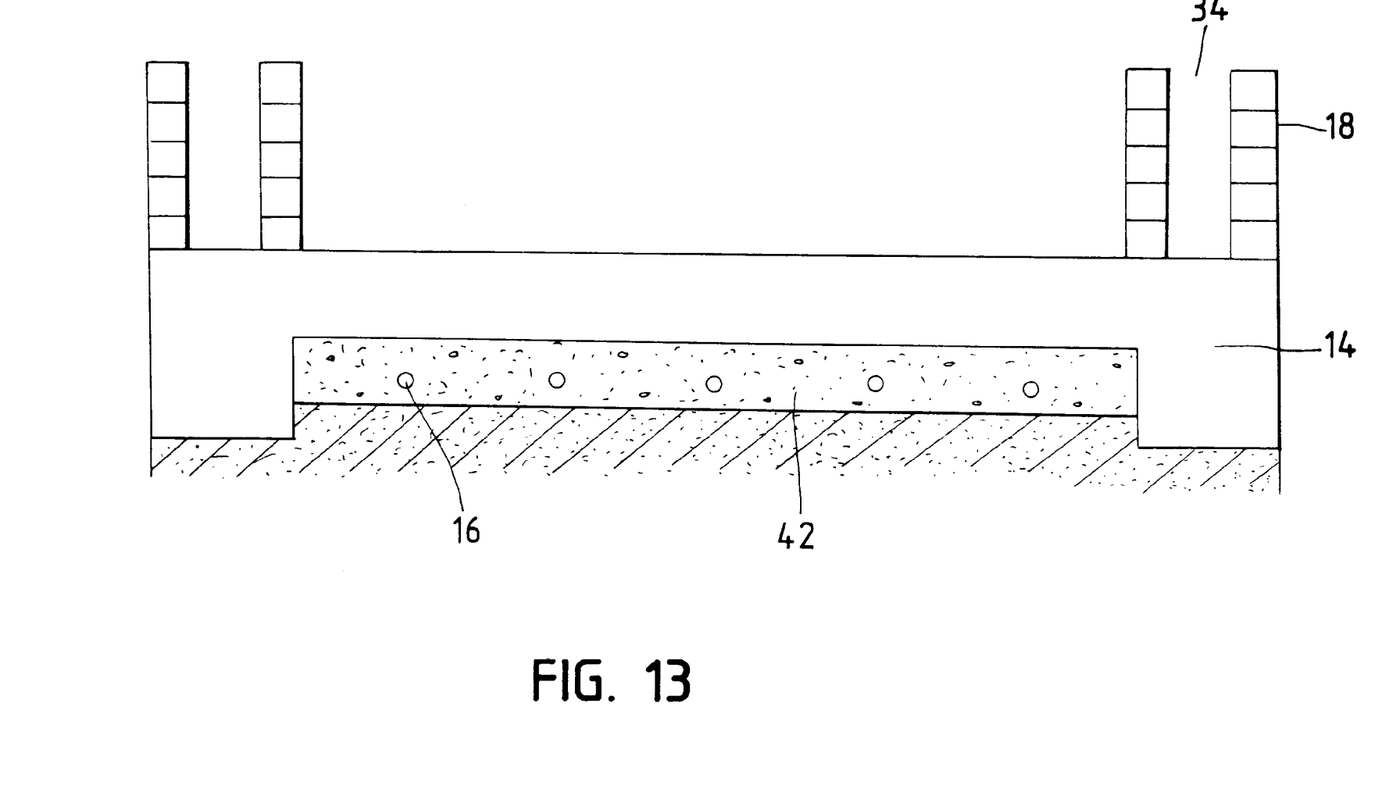
FIG. 13 is a cross section of a fully extended soaker bed system.

When pressurized liquid insecticide is injected into this underground system, insecticide will disperse from the holes 48 in the piping 16, as shown in FIGS. 9 and 12, as well as from the anchor heads 44 before combining with the blue metal pebbles to form a large surface barrier that will stop all underground intruders that may creep into any cavities and cracks through the slab 14. Such a system is far superior to other methods of direct soil insecticide spray system with piping buried directly into the soil which may eventually become clogged with prolong use. The inventive system does not interfere with any drainage or electrical systems under the construction slab, and has no direct contact with soil as the entire system is enclosed by the nylon membrane which reduces contamination of soil to a minimum. Therefore, the system is safe for children and all members of the household because of its environmentally friendly attributes.

The low pressure injection system is operable between 30 to 70 psi thus eliminating the risk of insecticide being flushed out at the overflow with other high pressurized methods. This enclosed piping system is joined to the same external opening 38 outside the house by going upward through the slab 14 to the external-access unit 40 (e.g., a stainless steel box having a door with the box mounted on the outside wall of the house). Such a system will allow for insecticide to be injected from outside the house, through the soaker bed 42 to the overflow indicator at the end of the pipeline system which is located next to the liquid insecticide injector connector in the external-access unit 40.

When in operation, fresh insecticide can be injected periodically throughout the system to provide maximum effectiveness. Preferably, each treatment should be no more than 20 minutes. At the end of each treatment, high pressurized air will be used to clean the system and ensure that residual insecticides have been defused completely through the anchor heads 44.

While the principles of the invention have been shown and described in connection with but a few embodiments, it is to be understood clearly that such embodiments are by way of example and are not limiting.

What is claimed is:

1. An insecticide dispensing apparatus for delivering insecticide from an outside source to a building having a foundation and a roof with a roof space thereunder, the apparatus comprising:

an access unit having an inlet port external to the building:

an upper pipeline arrangement in the roof space and extending to the access unit, the upper pipeline arrangement having at least one outlet in the roof space;

a lower pipeline arrangement under the foundation and extending to the access unit, the lower pipeline arrangement having at least one outlet under the foundation;

at least three connection points located at the access unit including a plurality of dry powder spray connectors and at least one liquid insecticide injector connector; and an overflow indicator, whereby insecticide is effectively distributed with respect to the building.

2. The insecticide dispensing apparatus of claim 1 wherein the foundation is a concrete slab.

3. The insecticide dispensing apparatus of claim 1 wherein the outlet in the upper pipeline arrangement is a spray head.

4. The insecticide dispensing apparatus of claim 3 wherein:

a plurality of spray heads are joined together with the upper pipeline arrangement and fixed to support beams located within the roof space in order to evenly disperse powdered insecticide over a controlled distance; and the upper pipeline arrangement extends from the roof space through a cavity inside the house to the access unit, thereby allowing insecticide spray to be injected from outside the house through a powder injector connector to the system.

5. The insecticide dispensing apparatus of claim 4 wherein the spray heads include three-way spray heads.

6. The insecticide dispensing apparatus of claim 5 wherein the three-way spray heads include a deflection plate and a flow control.

7. The insecticide dispensing apparatus of claim 1 wherein:

the lower pipeline arrangement is built into a blue metal pebble soaker bed;

the lower pipeline arrangement is joined together with anchor-spray heads;

the blue metal pebble soaker bed is positioned under a concrete slab and around the perimeter of a house; and the soaker bed and spray heads are wrapped in a protective netting and soil-proof casing, thereby preventing any foreign material from contaminating the soaker bed and spray heads.

8. The insecticide dispensing apparatus of claim 7 wherein:

the lower pipeline arrangement includes a plurality of holes; and insecticide is dispersed from the holes in the lower pipeline arrangement as well as from the spray heads when a low pressurized liquid insecticide is injected into the system.

9. The insecticide dispensing apparatus of claim 1 wherein insecticides are injected via the liquid connector into the soaker bed to the overflow indicator located at the end of the lower pipeline arrangement.

10. The insecticide dispensing apparatus of claim 1 wherein only one liquid injector connector is located in the unit.

11. An insecticide dispensing apparatus for delivering insecticide from an outside source to a building having a roof with a roof space thereunder, the apparatus comprising:

an access unit having an inlet port external to the building;

a pipeline arrangement in the roof space and extending to the access unit, the pipeline arrangement having at least one outlet in the roof space;

at least three connection points located at the access unit including a plurality of dry powder spray connectors and at least one liquid insecticide injector connector; and an overflow indicator, whereby insecticide is effectively distributed within the roof space of the building.

12. The insecticide dispensing apparatus of claim 11 wherein the outlet in the pipeline arrangement is a spray head.

13. The insecticide dispensing apparatus of claim 12 wherein:

a plurality of spray heads are joined together with the pipeline arrangement and fixed to support beams located within the roof space in order to evenly disperse powdered insecticide over a controlled distance; and the pipeline arrangement extends from the roof space through a cavity inside the house to the access unit, thereby allowing insecticide spray to be injected from outside the house through a powder injector connector to the system.

14. The insecticide dispensing apparatus of claim 13 wherein the spray heads include three-way spray heads.

15. The insecticide dispensing apparatus of claim 14 wherein the three-way spray heads include a deflection plate and a flow control.

16. An insecticide dispensing apparatus for delivering insecticide from an outside source to a building having a foundation, the apparatus comprising:

an access unit having an inlet port external to the building;

a blue metal pebble soaker bed positioned under a concrete slab and around the perimeter of the building;

a lower pipeline arrangement built into the blue metal pebble soaker bed under the foundation and extending to the access unit, the pipeline arrangement being joined together with anchor-spray heads and having at least one outlet under the foundation; and a protective netting and soil proof casing wrapping the soaker bed and spray heads thereby preventing any foreign material from contaminating the soaker bed and spray heads.

17. The insecticide dispensing apparatus of claim 16 wherein the foundation is a concrete slab.

18. The insecticide dispensing apparatus of claim 16 wherein:

the lower pipeline arrangement includes a plurality of holes; and insecticide is dispersed from the holes in the lower pipeline arrangement as well as from the spray heads when a pressurized liquid insecticide is injected into the system.

19. The insecticide dispensing apparatus of claim 18 wherein insecticides are injected via a liquid connector into the soaker bed to an overflow indicator located at the end of the lower pipeline arrangement.

20. The insecticide dispensing apparatus of claim 16 wherein only one liquid injector connector is located in the unit.

* * * * *